US012327962B2

(12) United States Patent
Nakagawa

(10) Patent No.: US 12,327,962 B2
(45) Date of Patent: Jun. 10, 2025

(54) ELECTRICAL CONNECTOR

(71) Applicant: I-PEX Inc., Kyoto (JP)

(72) Inventor: Yuta Nakagawa, Machida (JP)

( * ) Notice: Subject to any disclaimer, the term of this patent is extended or adjusted under 35 U.S.C. 154(b) by 414 days.

(21) Appl. No.: 18/150,294

(22) Filed: Jan. 5, 2023

(65) Prior Publication Data

US 2023/0155332 A1 May 18, 2023

Related U.S. Application Data

(63) Continuation of application No. PCT/JP2021/022554, filed on Jun. 14, 2021.

(30) Foreign Application Priority Data

Jul. 10, 2020 (JP) ................................ 2020-119103

(51) Int. Cl.
*H01R 24/50* (2011.01)

(52) U.S. Cl.
CPC .................................. *H01R 24/50* (2013.01)

(58) Field of Classification Search
CPC ................................ H01R 24/50; H01R 24/52
USPC .......................................................... 439/578
See application file for complete search history.

(56) References Cited

U.S. PATENT DOCUMENTS 6,074,217 A 6/2000 Maruyama et al.
2004/0137764 A1 7/2004 Yamane
2006/0141811 A1 6/2006 Shichida et al.
2011/0097930 A1 4/2011 Zuinen et al.
2011/0275243 A1 11/2011 Taguchi
2012/0009817 A1 1/2012 Tagawa et al.
2020/0381878 A1* 12/2020 Tanaka .................. H01R 24/44
(Continued)

FOREIGN PATENT DOCUMENTS

CN 105790009 7/2016
JP H8-321361 12/1996
JP 2004-221055 8/2004
(Continued)

OTHER PUBLICATIONS

International Search Report dated Aug. 17, 2021 for PCT/JP2021/022554.
(Continued)

*Primary Examiner* — Tulsidas C Patel
*Assistant Examiner* — Thaslimur Rahman
(74) *Attorney, Agent, or Firm* — SOEI PATENT & LAW FIRM

(57) ABSTRACT

A receptacle connector includes a ground contact including a cylindrical fitting portion and a grounding connection portion connected to a substrate, a signal contact disposed in a manner of being surrounded by the fitting portion, a housing holding the ground contact and the signal contact in an insulated state, and a fixing portion fixing the housing to the ground contact. The signal contact has a central conductor and a signal connection portion extending in a manner of being drawn out from the central conductor and connected to a signal terminal portion. The fixing portion extends from the housing in a direction intersecting an extending direction of the signal connection portion and fixes the housing to the ground contact by being interlocked with the grounding connection portion outside the fitting portion.

20 Claims, 12 Drawing Sheets

(56) References Cited

U.S. PATENT DOCUMENTS

2021/0273386 A1 * 9/2021 Nakamura ............ H01R 24/50

FOREIGN PATENT DOCUMENTS

| | | |
|---|---|---|
| JP | 2006-185773 | 7/2006 |
| JP | 5024449 | 9/2012 |
| JP | 2015-028873 | 2/2015 |
| JP | 2020-087630 | 6/2020 |
| WO | 2009/130964 | 10/2009 |
| WO | 2010/087202 | 8/2010 |
| WO | 2010/109550 | 9/2010 |

OTHER PUBLICATIONS

International Preliminary Report on Patentability with Written Opinion dated Jan. 19, 2023 for PCT/JP2021/022554.

* cited by examiner

ELECTRICAL CONNECTOR

CROSS-REFERENCE TO RELATED APPLICATIONS

This application is a continuation application of PCT Application No. PCT/JP2021/022554, filed on Jun. 14, 2021, which claims the benefit of priority from Japanese Patent Application No. 2020-119103, filed on Jul. 10, 2020. The entire contents of the above listed PCT and priority applications are incorporated herein by reference.

BACKGROUND

The present disclosure relates to an electrical connector.

A connector device which electrically connects a signal transmission member and an electric circuit of a substrate to each other by fitting a plug connector connected to the signal transmission member into a receptacle connector mounted in the substrate is known (for example, refer to Japanese Patent No. 5024449). The receptacle connector in Japanese Patent No. 5024449 includes an external conductor which engages with a tubular conductor of a plug connector, an internal conductor which comes into contact with a conductor of the plug connector inside the external conductor, and an insulator.

Here, in the receptacle connector disclosed in Japanese Patent No. 5024449, for example, when a load is applied to an insulator (housing) from the outside, there is concern that the insulator may peel off from an external conductor together with an internal conductor. It is also conceivable to provide a configuration for preventing the insulator from peeling off from the external conductor. However, in order to employ such a configuration, there is a need to form an opening (an opening for holding the insulator) in the external conductor. By forming such an opening, a signal inside the connector is likely to leak to the outside (noise is likely to be generated) so that EMI characteristics of the connector deteriorate.

The present disclosure has been made in consideration of the foregoing circumstances, and an object thereof is to provide an electrical connector in which a housing may be favorably held while EMI characteristics are improved.

SUMMARY

An electrical connector according to an aspect of the present disclosure is an electrical connector mounted on a substrate. The electrical connector includes a first contact having a cylindrical fitting portion fitted into a ground contact of a counterpart connector, and a grounding connection portion connected to the substrate; a second contact surrounded by the fitting portion and electrically connected to a signal contact of the counterpart connector and includes a central conductor coming into contact with the signal contact of the counterpart connector; a signal connection portion extending in a first direction along the substrate from the central conductor and connected to a terminal portion of the substrate; a housing holding the first contact and the second contact in an insulated state; and a fixing portion fixing the housing to the first contact. The fixing portion extends from the housing in a second direction intersecting the first direction and fixes the housing to the first contact by being interlocked with the grounding connection portion outside the fitting portion.

According to the present disclosure, a housing in an electrical connector may be favorably held while EMI characteristics are improved.

BRIEF DESCRIPTION OF THE DRAWINGS

FIG. 3A is a plan view, FIG. 3B is a bottom view, FIG. 3C is a perspective view, and FIG. 3D is a cross-sectional view along line A-A in FIG. 3A.

FIG. 4A is a plan view, FIG. 4B is a bottom view, and FIG. 4C is a perspective view.

FIG. 5A is a plan view, FIG. 5B is a bottom view, and FIG. 5C is a perspective view.

FIG. 6A is a plan view, FIG. 6B is a bottom view, and FIG. 6C is a perspective view.

FIG. 7A is a plan view, and FIG. 7B is a cross-sectional view along line A-A in FIG. 7A.

FIG. 8A is a perspective view of the connector device according to the comparative example, and FIG. 8B is a perspective view of a receptacle connector included in the connector device according to the comparative example.

FIG. 10A is a plan view, FIG. 10B is a bottom view, and FIG. 10C is a perspective view.

FIG. 11A is a plan view, FIG. 11B is a bottom view, and FIG. 11C is a perspective view.

FIG. 12A is a plan view, FIG. 12B is a bottom view, and FIG. 12C is a perspective view.

DETAILED DESCRIPTION

Since an example according to the present disclosure described below is merely an example for describing the present disclosure, the present disclosure should not be limited to the following details. In the following description, the same reference signs are used for the same elements or elements having the same function, and duplicate description will be omitted.

[Overview of Connector Device]

Figure 1:
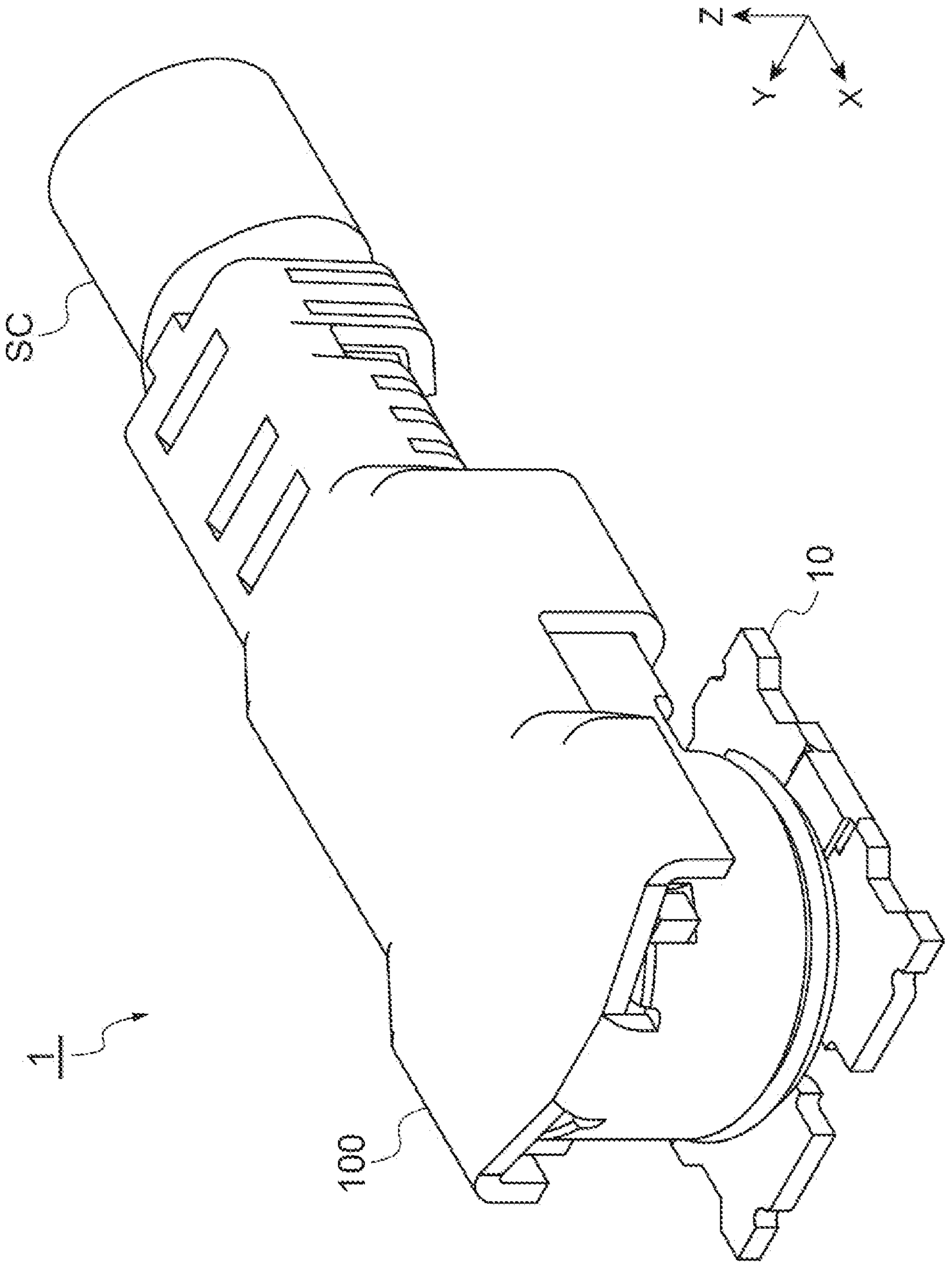
FIG. 1 is a perspective view of a connector device according to an example of the present disclosure.
Figure 2:
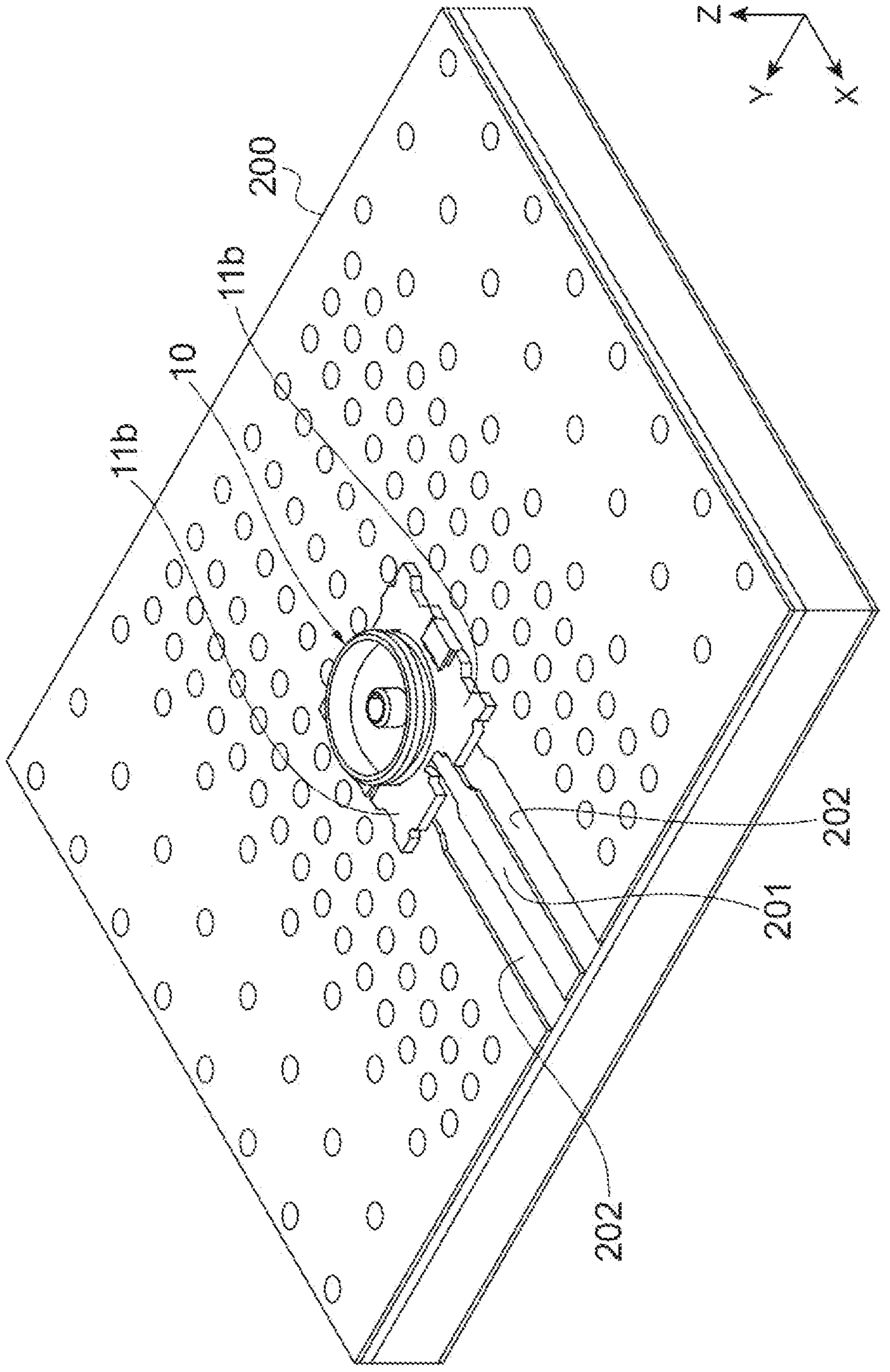
FIG. 2 is a perspective view of a receptacle connector mounted on a printed wiring board.

With reference to FIGS. 1 and 2, an overview of a connector device 1 will be described. As illustrated in FIG. 1, the connector device 1 includes a receptacle connector 10 (electrical connector) and a plug connector 100 (counterpart connector). The receptacle connector 10 is mounted on a substrate 200 (refer to FIG. 2), for example, by soldering or the like. The plug connector 100 is connected to a coaxial cable SC (signal transmission member) and fitted into the receptacle connector 10. In the connector device 1, when the plug connector 100 attached to a terminal part of the coaxial cable SC is fitted into the receptacle connector 10 mounted on the substrate 200, the coaxial cable SC and an electric circuit of the substrate 200 are electrically connected to each other. For example, the substrate 200 is a printed wiring board, but it is not limited thereto. In addition, in place of the coaxial cable SC, other signal transmission members transmitting a signal of various electronic instruments may be used.

In the following description, a fitting direction of the receptacle connector 10 and the plug connector 100 in the connector device 1 may be described as "a Z direction", an axial direction of the coaxial cable SC in a fitted state may be described as "an X direction", and a direction orthogonal to the Z direction and the X direction may be described as "a Y direction". In addition, regarding the Z direction, for example, the plug connector 100 side in the state illustrated in FIG. 1 may be described as "an upward side", and the receptacle connector 10 side may be described as "a downward side". In addition, regarding the X direction, an end portion side in the coaxial cable SC where the plug connector 100 is attached may be described as "front", and the opposite end portion side may be described as "rear".

[Receptacle Connector]

Figure 3A:
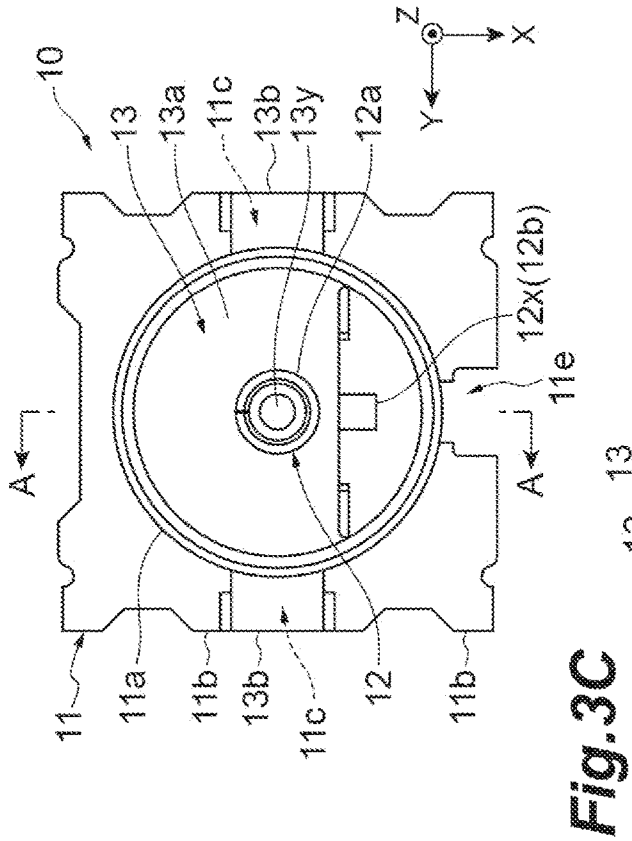
FIGS. 3A to 3D are views illustrating the receptacle connector.
Figure 3B:
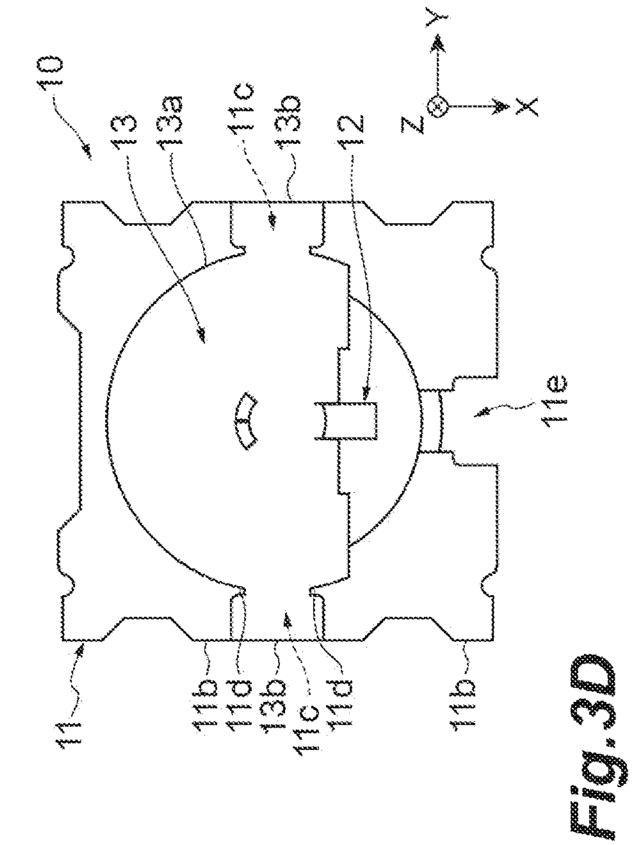
Figure 3C:
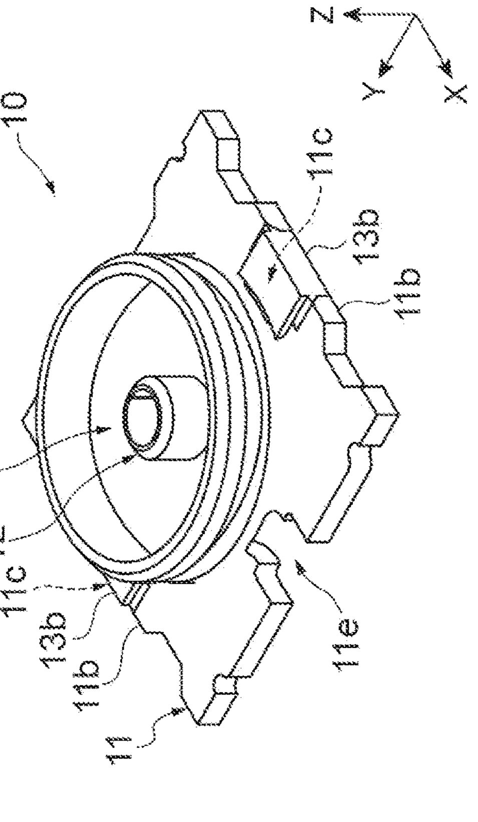
Figure 3D:
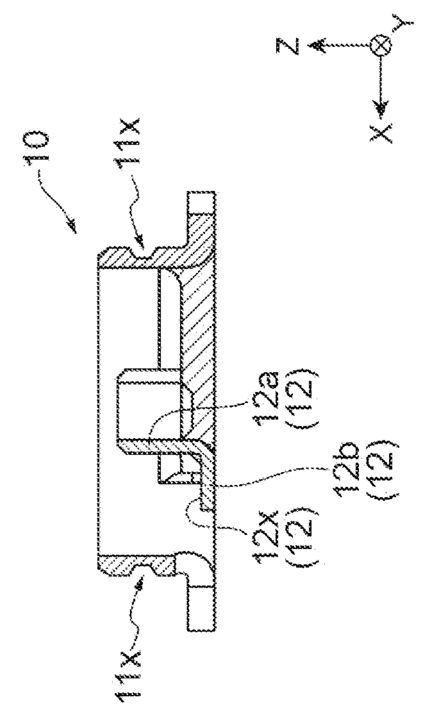

Next, with reference to FIGS. 3A to 6C, details of the receptacle connector 10 will be described. The receptacle connector 10 is mounted on the substrate 200 (refer to FIG. 2) and fitted into the plug connector 100 attached to the coaxial cable SC (refer to FIG. 1). As illustrated in FIGS. 3A to 3C, the receptacle connector 10 includes a ground contact 11 (first contact), a signal contact 12 (second contact), and an insulator 13 (a housing 13*a* and fixing portions 13*b*).

(Ground Contact)

Figure 4A:
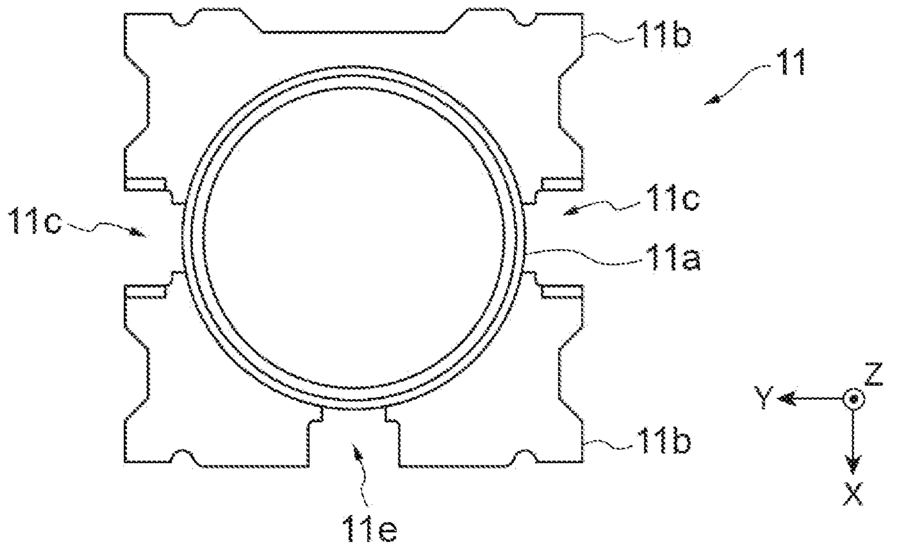
FIGS. 4A to 4C are views illustrating a ground contact of the receptacle connector.
Figure 4B:
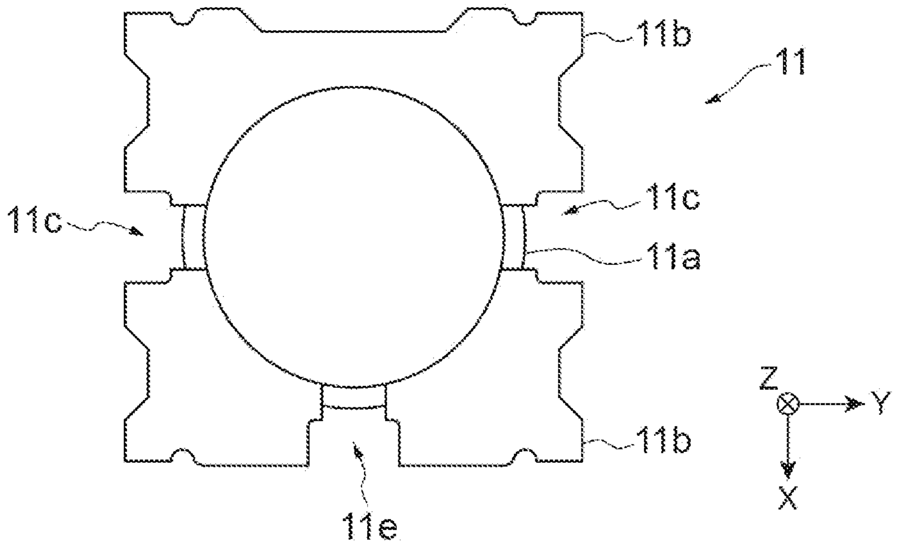
Figure 4C:
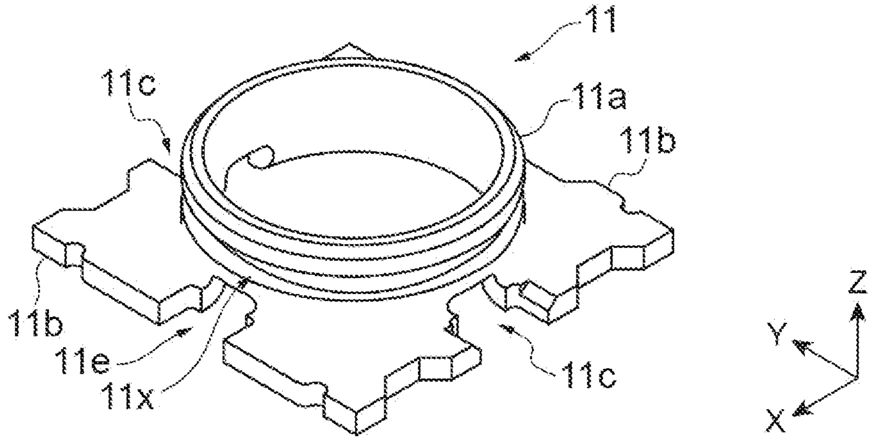

As illustrated in FIGS. 4A to 4C, the ground contact 11 has a cylindrical fitting portion 11*a* which is fitted into a ground contact 101 of the plug connector 100 (refer to FIG. 7B), and grounding connection portions 11*b* which are connected to the substrate 200. The ground contact 11 is electrically connected to the ground contact 101 (refer to FIG. 7B), thereby forming a ground circuit. For example, the ground contact 11 is formed of a metal member having a thin plate shape.

The fitting portion 11*a* is formed to have a cylindrical shape (tubular shape) having the Z direction as the axial direction thereof and accommodates the housing 13*a* inside a tube hole thereof. An inner circumferential surface of the fitting portion 11*a* comes into contact with an outer circumferential surface of the housing 13*a* (refer to FIG. 3A) excluding a region in which the housing 13*a* is not formed. On an outer circumferential surface of the fitting portion 11*a*, a recessed portion 11*x* recessed to an inward side in a radial direction (the central side of the fitting portion 11*a*) is formed throughout the whole circumference (refer to FIG. 3D). When the recessed portion 11*x* engages with a projecting portion 101*x* (refer to FIG. 7B) formed in an outer circumference of the ground contact 101 of the plug connector 100, the fitting portion 11*a* is fitted into the ground contact 101 of the plug connector 100 (details will be described below). The fitting portion 11*a* is provided such that it stands upright from the grounding connection portions 11*b*.

As illustrated in FIG. 2, the grounding connection portions 11*b* are disposed on the substrate 200 such that they are connected to ground terminal portions 202 of the substrate 200. As illustrated in FIGS. 4A to 4C, openings 11*c* and 11*c* and an opening 11*e* penetrated in the Z direction are formed in the grounding connection portions 11*b* along the outer circumference of the fitting portion 11*a*. The openings 11*c* and 11*c* are formed at positions symmetrical with respect to a centerline connecting a central conductor 12*a* and a signal connection portion 12*b* to each other when viewed in the Z direction. Specifically, they are formed at positions facing each other in the Y direction. The openings 11*c* and 11*c* are formed in an extending direction of the fixing portions 13*b*, which will be described below (refer to FIG. 3B). The openings 11*c* and 11*c* are filled with the fixing portions 13*b* (refer to FIG. 3B). The opening 11*e* is formed at a position intersecting (specifically, orthogonal to) a line segment connecting the openings 11*c* and 11*c* to each other. The opening 11*e* is formed in the extending direction of the signal connection portion 12*b* of the signal contact 12, which will be described below (refer to FIG. 3B). In the present example, an exposed portion 12*x* (which will be described below) is accommodated within a region surrounded by the fitting portion 11*a* of the ground contact 11. In a manufacturing process, a carrier (not illustrated) for putting a plurality of ground contacts 11 in a row extends from the signal connection portion 12*b* through the opening 11*e*, and the exposed portion 12*x* is formed by cutting the carrier at a predetermined position. The opening 11*e* is formed with a narrow gap for inserting the carrier therethrough.

In addition, the grounding connection portions 11*b* have narrow width portions 11*d* and 11*d* which are provided outside the fitting portion 11*a* such that the width of the opening 11*c* is narrowed (refer to FIG. 3B). The narrow width portions 11*d* and 11*d* are provided in a manner of leading to the grounding connection portions 11*b* at both ends of the opening 11*c* in the X direction. The narrow width portions 11*d* and 11*d* are formed to have projection shapes protruding in a direction in which they face each other. In addition, the narrow width portions 11*d* and 11*d* are provided such that they are positioned between the housing 13*a* and the fixing portions 13*b*. The positions of the narrow width portions 11*d* and 11*d* are not limited to that described above. For example, they may be provided in the vicinity of the center in the Y direction in the opening 11*c*. In addition, the grounding connection portions 11*b* may have only one narrow width portion 11*d* corresponding to each opening 11*c* or may have three or more narrow width portions 11*d* corresponding to each opening 11*c*.

(Signal Contact)

Figure 5A:
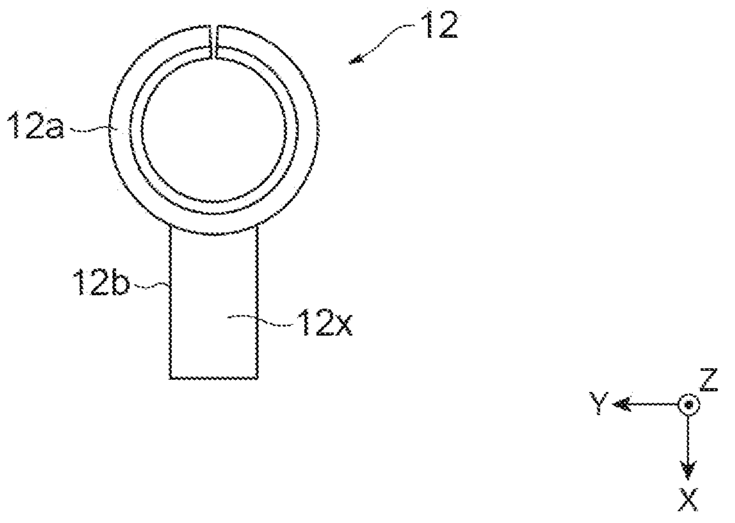
FIGS. 5A to 5C are views illustrating a signal contact of the receptacle connector.
Figure 5B:
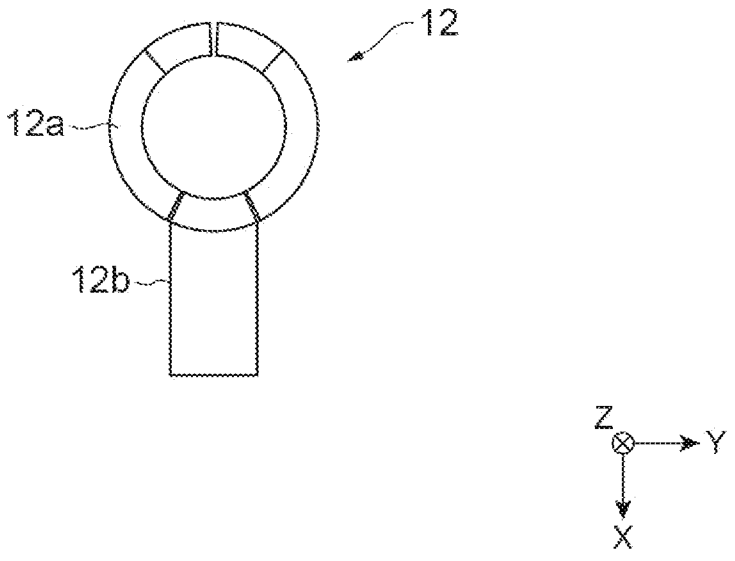
Figure 5C:
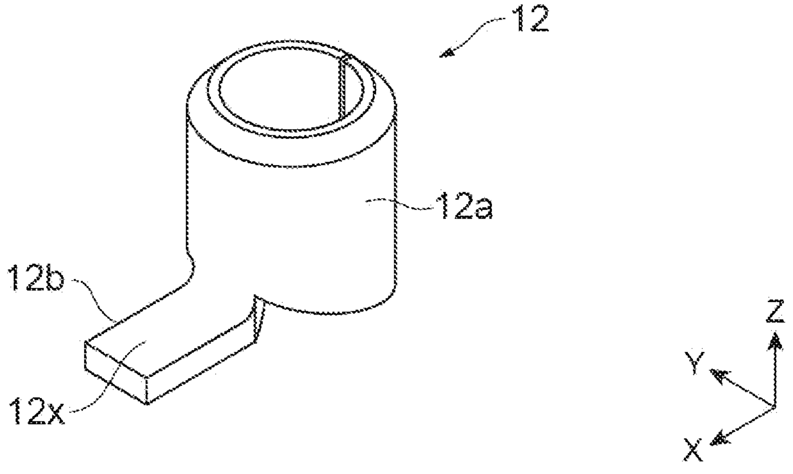
Figure 7A:
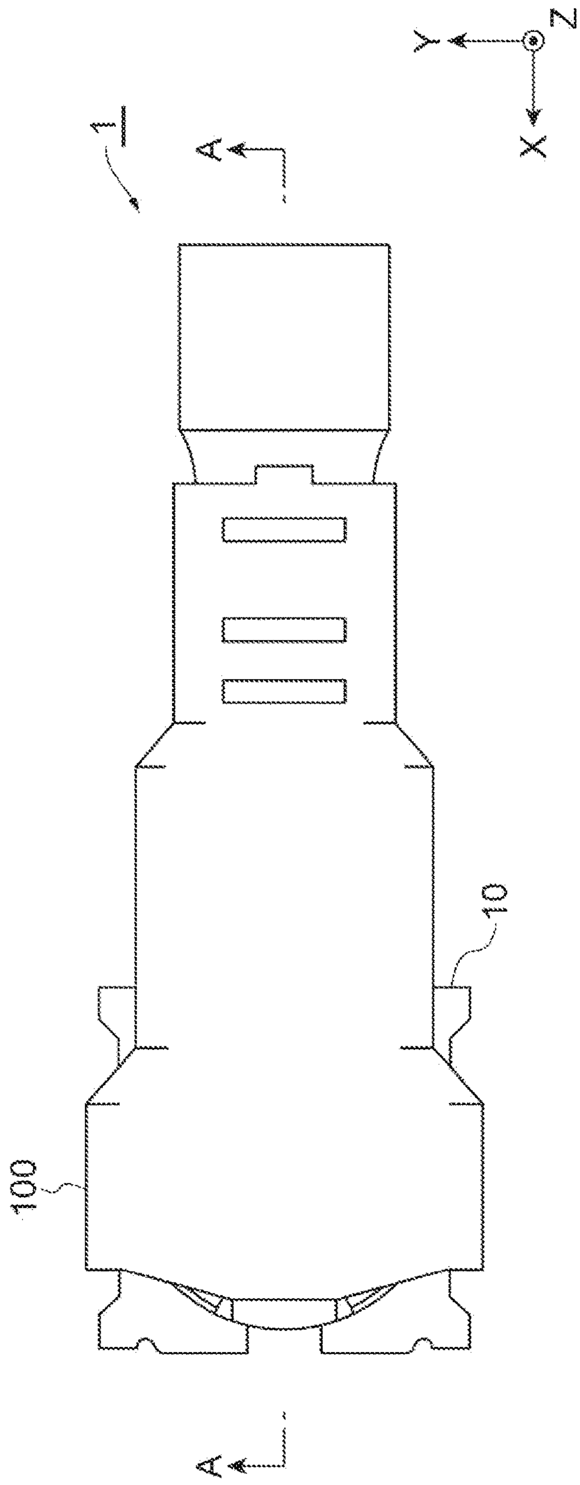
FIGS. 7A and 7B are views illustrating a fitted state between a plug connector and the receptacle connector.
Figure 7B:
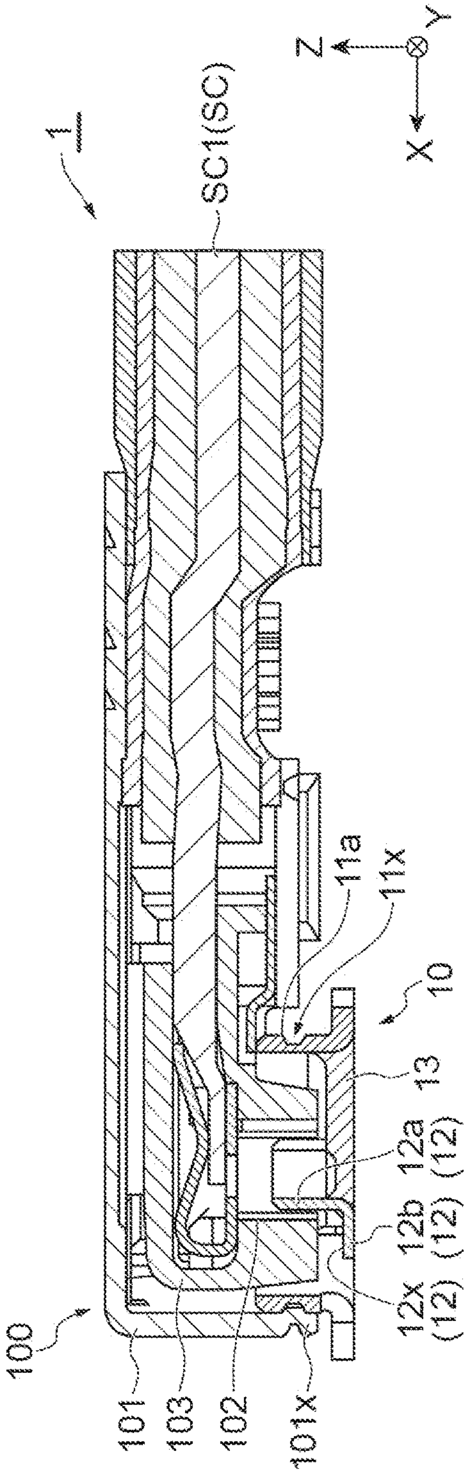

As illustrated in FIGS. 3A to 3C, the signal contact 12 is disposed in a manner of being surrounded by the fitting portion 11*a* and electrically connected to a signal contact 102 of the plug connector 100 (refer to FIG. 7B). The signal contact 12 is attached to the housing 13*a*. For example, the signal contact 12 is a signal transmission conductor which is formed of a metal member having a thin plate shape. As illustrated in FIGS. 5A to 5C, the signal contact 12 has the central conductor 12*a* and the signal connection portion 12*b*.

The central conductor 12*a* is a conductor which comes into contact with the signal contact 102 of the plug connector 100 (refer to FIG. 7B). The central conductor 12*a* is formed to have a cylindrical shape (tubular shape) having the Z direction as the axial direction thereof and comes into contact with the signal contact 102 on the outer circumferential surface (refer to FIG. 7B). The central conductor 12*a* is attached to a support portion 13*y* of the housing 13*a* (refer to FIG. 3A). The signal connection portion 12*b* extends along the substrate 200 in a manner of being drawn out from the central conductor 12*a* and is connected to a signal terminal portion 201 of the substrate 200 (refer to FIG. 2). That is, the signal connection portion 12*b* leads to a lower end of the central conductor 12*a*, extends forward in the X direction (in a direction in which it approaches the fitting portion 11*a* and a direction in which it becomes distant from an internal conductor SC1 of the coaxial cable SC (refer to FIG. 7B)), and comes into contact with the signal terminal portion 201 of the substrate 200 (refer to FIG. 2). Although the shape of the signal connection portion 12*b* is not limited, for example, as illustrated in FIGS. 5A and 5C, it is a plate-shaped member and exhibits substantially a rectangular shape in which the length in the Y direction is shorter than the length in the X direction when viewed in the Z direction.

As illustrated in FIG. 3A, the signal connection portion 12*b* is accommodated within a region surrounded by the fitting portion 11*a* of the ground contact 11, and the exposed portion 12*x*, which is a tip (front end) part thereof, is exposed to the outside. For example, being exposed to the outside denotes that it may be visually recognized from the outside. More specifically, the signal connection portion 12*b* is disposed such that the exposed portion 12*x* (a part thereof) may be visually recognized when viewed in the Z direction that is a direction from the plug connector 100 toward the substrate 200. The exposed portion 12*x* is a region which comes into contact with the signal terminal portion 201 in the signal connection portion 12*b* (refer to FIG. 2).

(Housing and Fixing Portion)

Figure 6A:
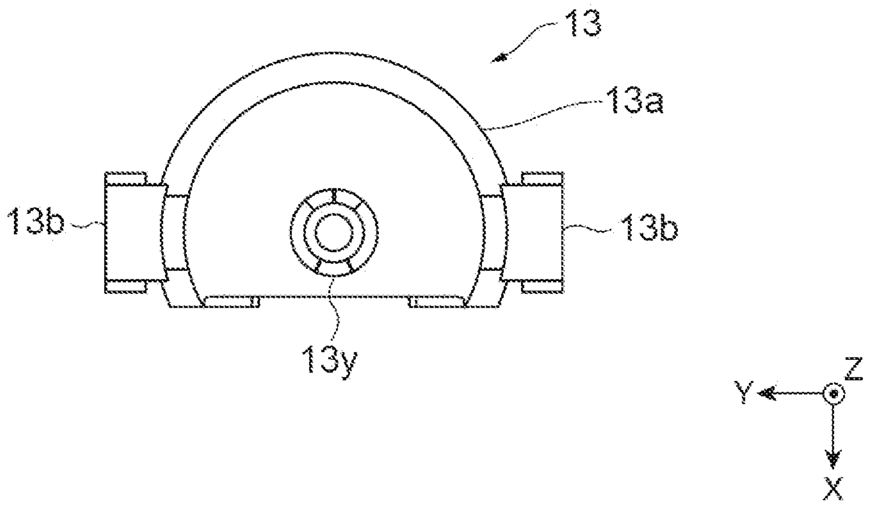
FIGS. 6A to 6C are views illustrating an insulator (a housing and a fixing portion) of the receptacle connector.
Figure 6B:
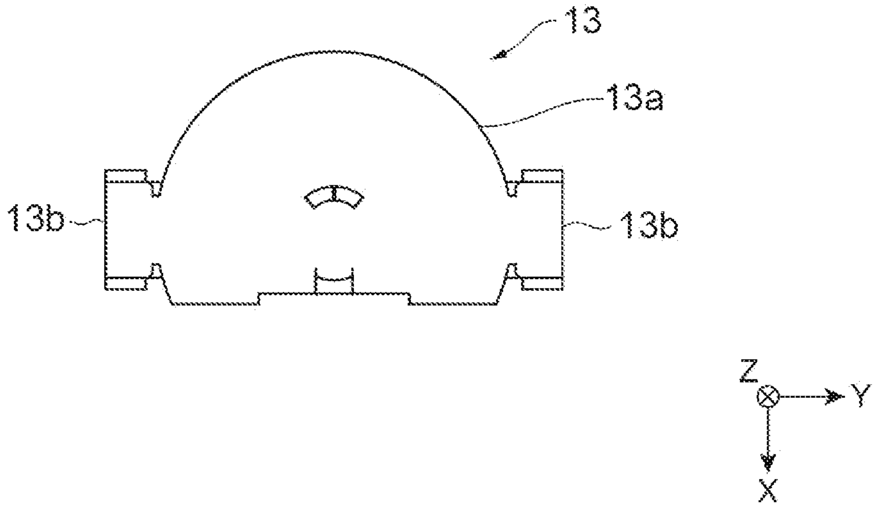
Figure 6C:
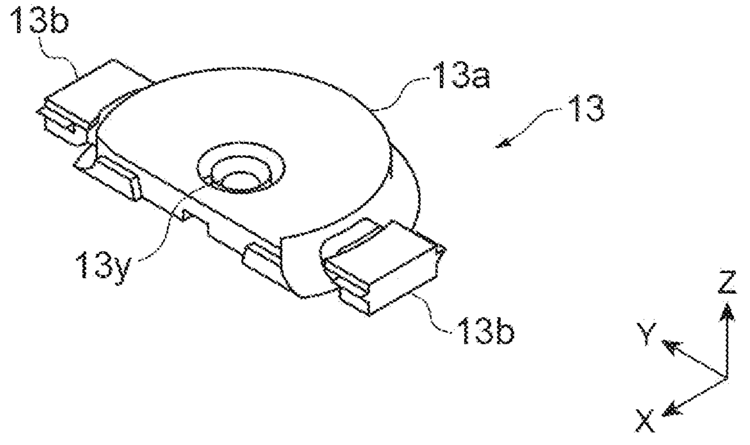

The insulator 13 is a member for insulating the ground contact 11 and the signal contact 12 from each other and is formed by a resin. As illustrated in FIGS. 6A to 6C, the insulator 13 has the housing 13*a* and the fixing portions 13*b*.

The housing 13*a* holds the ground contact 11 and the signal contact 12 in an insulated state. The housing 13*a* is a member which is formed to have substantially a disk shape and accommodated on the inward side of the fitting portion 11*a*. The outer circumferential surface of the housing 13*a* comes into contact with the inner circumferential surface of the fitting portion 11*a* excluding a region in which the housing 13*a* is not formed (refer to FIG. 3A). In addition, a part of the outer circumferential surface of the housing 13*a* comes into contact with the narrow width portions 11*d* and 11*d* (refer to FIG. 3B). As illustrated in FIGS. 6A and 6C, in a central part thereof, the housing 13*a* has the support portion 13*y* for attaching the central conductor 12*a*.

As illustrated in FIG. 3A, the housing 13*a* is provided in only a region inside the fitting portion 11*a* in the extending direction of the signal connection portion 12*b*. That is, the housing 13*a* has a shape which does not reach (a shape which does not arrive at) the opening 11*e* formed in the extending direction (X direction) of the signal connection portion 12*b*. Particularly, the housing 13*a* is provided in only a region closer to the central conductor 12*a* than the tip of the signal connection portion 12*b* in the extending direction of the signal connection portion 12*b* when viewed in the fitting direction of the plug connector 100. The housing 13*a* is formed such that the exposed portion 12*x* that is a region which comes into contact with the signal terminal portion 201 in the signal connection portion 12*b* is exposed to the outside. For example, the housing 13*a* may be formed such that the exposed portion 12*x* is exposed to the outside by cutting out a part of the housing 13*a*.

The fixing portions 13*b* fix the housing 13*a* to the ground contact 11. The fixing portions 13*b* extend from the housing 13*a* in a direction intersecting (specifically, orthogonal to) the extending direction of the signal connection portion 12*b* and fix the housing 13*a* to the ground contact 11 by being interlocked with the grounding connection portions 11*b* outside the fitting portion 11*a*. As illustrated in FIG. 3A, the insulator 13 has a plurality of (specifically, a pair of) fixing portions 13*b* and 13*b*. The pair of fixing portions 13*b* and 13*b* are provided at positions symmetrical with respect to the centerline connecting the central conductor 12*a* and the signal connection portion 12*b* to each other when viewed in the Z direction. Specifically, they are provided at positions facing each other in the Y direction. As illustrated in FIGS. 6A to 6C, the fixing portions 13*b* and 13*b* lead to the housing 13*a* and extend in a direction in which they are separated from each other in the Y direction (the outward side in the Y direction).

The pair of fixing portions 13*b* and 13*b* are provided at positions corresponding to the pair of openings 11*c* and 11*c*. That is, in one fixing portion 13*b*, one opening 11*c* is filled with a resin therethrough, and in the other fixing portion 13*b*, the other opening 11*c* is filled with a resin therethrough (refer to FIG. 3B). The fixing portions 13*b* and 13*b* pass through the openings 11*c* and 11*c* of the grounding connection portions 11*b* (refer to FIGS. 4A to 4C) formed in the extending direction (X direction) of the signal connection portion 12*b* and extend to the outside of the fitting portion 11*a* (refer to FIGS. 3A and 3C). Further, the fixing portions 13*b* and 13*b* are provided outside the fitting portion 11*a* such that a part of the grounding connection portions 11*b* is divided, and they are interlocked with the grounding connection portions 11*b* (refer to FIG. 3C). Moreover, the fixing portions 13*b* and 13*b* are also interlocked with the narrow width portions 11*d* and 11*d* provided in the grounding connection portions 11*b* (refer to FIG. 3B). In this manner, since the fixing portions 13*b* and 13*b* are interlocked with the grounding connection portions 11*b* and the narrow width portions 11*d* and 11*d*, peeling of the housing 13*a* to which the fixing portions 13*b* and 13*b* are connected from the ground contact 11 may be effectively curbed. In this manner, the fixing portions 13*b* and 13*b* fix the housing 13*a* to the ground contact 11.

[Connector Device (Fitted State Between Receptacle Connector and Plug Connector)]

Next, with reference to FIGS. 7A and 7B, the connector device 1 in a state in which the receptacle connector 10 and the plug connector 100 are fitted to each other will be described in detail.

As illustrated in FIG. 7B, the plug connector 100 has the ground contact 101, the signal contact 102, and a housing 103. The ground contact 101 is a cylindrical contact member which is fitted into the ground contact 11. The ground contact 101 is connected to an external conductor of the coaxial cable SC. The projecting portion 101*x* protruding to the inward side in the radial direction (the central side of the cylindrical ground contact 101) are formed on the lower end side of the ground contact 101 throughout the whole circumference. The signal contact 102 is electrically connected to the signal contact 12. The signal contact 102 is attached to the inside of the housing 103, connected to the internal conductor SC1 of the coaxial cable SC, and connected to the central conductor 12*a* of the signal contact 12 of the receptacle connector 10. The housing 103 is formed to have a cylindrical shape and holds the ground contact 101 and the signal contact 102 in an insulated state. The outer circumferential surface of the housing 103 comes into contact with the inner circumferential surface of the ground contact 101.

As illustrated in FIG. 7B, due to the recessed portion 11*x* of the fitting portion 11*a* of the receptacle connector 10, the receptacle connector 10 and the plug connector 100 are in a state of being fitted to each other. In the fitted state, the signal contact 102 of the plug connector 100 comes into contact with the central conductor 12*a* of the receptacle connector 10. In this manner, the signal contact 102 connected to the internal conductor SC1 of the coaxial cable SC and the central conductor 12*a* connected to the signal terminal portion 201 of the substrate 200 (refer to FIG. 2) via the signal connection portion 12*b* come into contact with each other, thereby forming a signal transmission circuit of the connector device 1. In addition, in the fitted state, the ground contact 101 of the plug connector 100 comes into contact with the fitting portion 11*a* of the receptacle connector 10. In this manner, the ground contact 101 connected to the external conductor of the coaxial cable SC and the fitting portion 11*a* connected to the ground terminal portions 202 of the substrate 200 (refer to FIG. 2) via the grounding connection portions 11*b* come into contact with each other, thereby forming the ground circuit of the connector device 1.

Further, in the connector device 1, in the fitted state, as illustrated in FIG. 7B, the signal connection portion 12*b* is accommodated within a region surrounded by the ground contact 101 of the plug connector 100. In addition, in a non-fitted state, as illustrated in FIG. 3A, the exposed portion 12*x* of the signal connection portion 12*b* is exposed to the outside (that is, it is disposed such that it may be visually recognized).

Figure 8A:
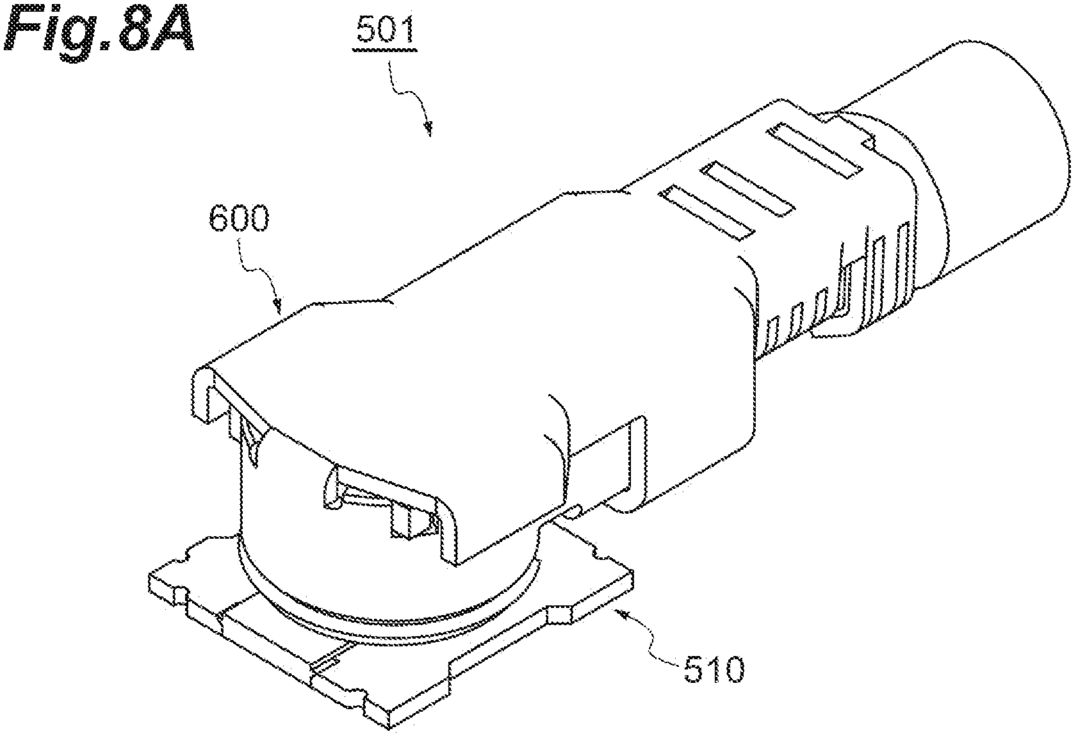
FIGS. 8A and 8B are views illustrating a connector device according to a comparative example.

Next, with reference to FIGS. 8A to 9, electromagnetic interference (EMI) characteristics of the connector device 1 will be described.

Figure 8B:
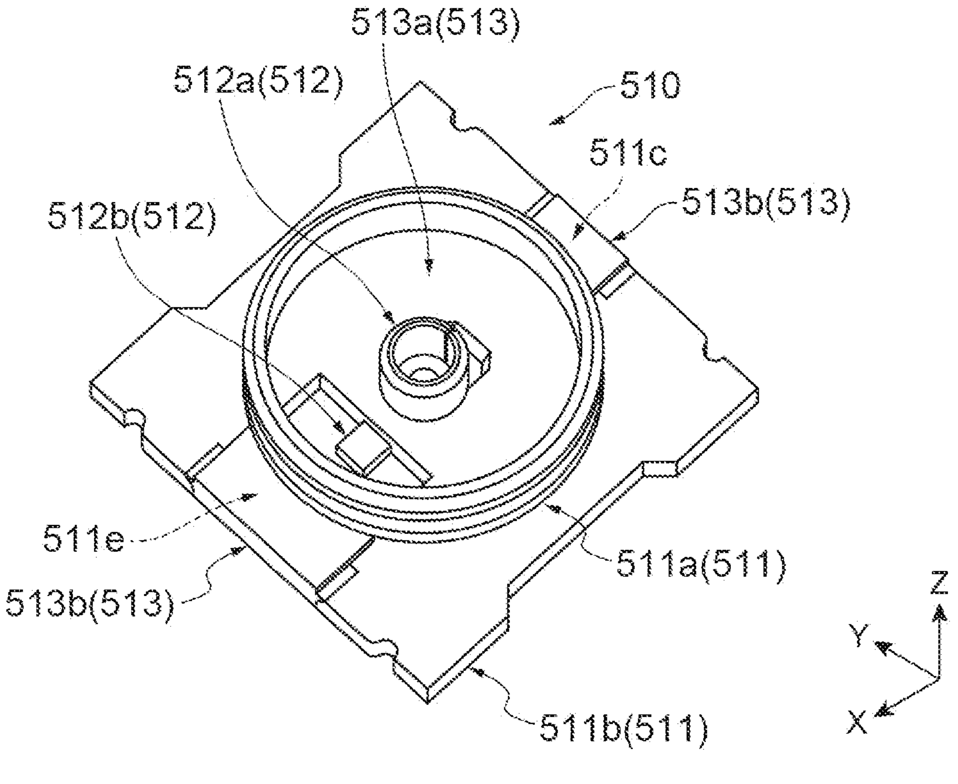

First, with reference to FIGS. 8A and 8B, a connector device 501 according to a comparative example will be described. Similar to the connector device 1 of the present example, the connector device 501 is a connector device which electrically connects the signal transmission member and the electric circuit of the substrate. FIG. 8A illustrates a receptacle connector 510 and a plug connector 600 in the fitted state. As illustrated in FIG. 8B, the receptacle connector 510 of the connector device 501 has a ground contact 511, a signal contact 512, and an insulator 513. Further, the ground contact 511 has a fitting portion 511*a* and a grounding connection portion 511*b*. The signal contact 512 has a central conductor 512*a* and a signal connection portion 512*b* which is drawn out to the outside from the central conductor 512*a*. The insulator 513 has a housing 513*a* and a fixing portion 513*b*.

In the receptacle connector 510 of the connector device 501 according to the comparative example, openings 511*c* and 511*e* penetrated in the Z direction are formed in the grounding connection portion 511*b* along the outer circumference of the fitting portion 511*a*. The openings 511*c* and 511*e* are formed at positions facing each other in the X direction. Specifically, the opening 511*c* is formed in a direction opposite to the extending direction of the signal connection portion 512*b* based on the central conductor 512*a*, and the opening 511*e* is formed in the extending direction of the signal connection portion 512*b* based on the central conductor 512*a*. Each of the openings 511*c* and 511*e* is filled with the fixing portion 513*b*. A pair of fixing portions 513*b* and 513*b* are formed at positions facing each other in the X direction. The fixing portions 513*b* and 513*b* extend in the extending direction of the signal connection portion 512*b* and in a direction opposite to the extending direction from the housing 513*a* and fix the housing 513*a* to the ground contact 511 by being interlocked with the grounding connection portion 511*b* outside the fitting portion 511*a*. In the connector device 501 according to the comparative example, in order to employ a configuration in which the fixing portions 513*b* and 513*b* for holding the housing 513*a* are interlocked with the grounding connection portion 511*b*, there is a need to provide the openings 511*c* and 511*e* for disposing the fixing portions 513*b* and 513*b* (for filling with a resin or the like forming the fixing portions 513*b* and 513*b*) in the grounding connection portion 511*b* of the ground contact 511. Here, the opening 511*e* needs to have a width for filling the fixing portion 513*b* equal to or larger than the width which is required to realize contact between the signal terminal portion 201 (refer to FIG. 2) and the signal connection portion 512*b*. Therefore, in the connector device 501 according to the comparative example, the opening 511*e* in the extending direction of the signal connection portion 512*b* formed in the grounding connection portion 511*b* becomes larger than the opening 11*e* in the extending direction of the signal connection portion 12*b* formed in the grounding connection portions 11*b* of the receptacle connector 10 (an opening of the connector device 1 according to the present example, that is, an opening formed for inserting the carrier therethrough for putting a plurality of ground contacts 11 in a row) (refer to FIGS. 3A to 3C).

Figure 9:
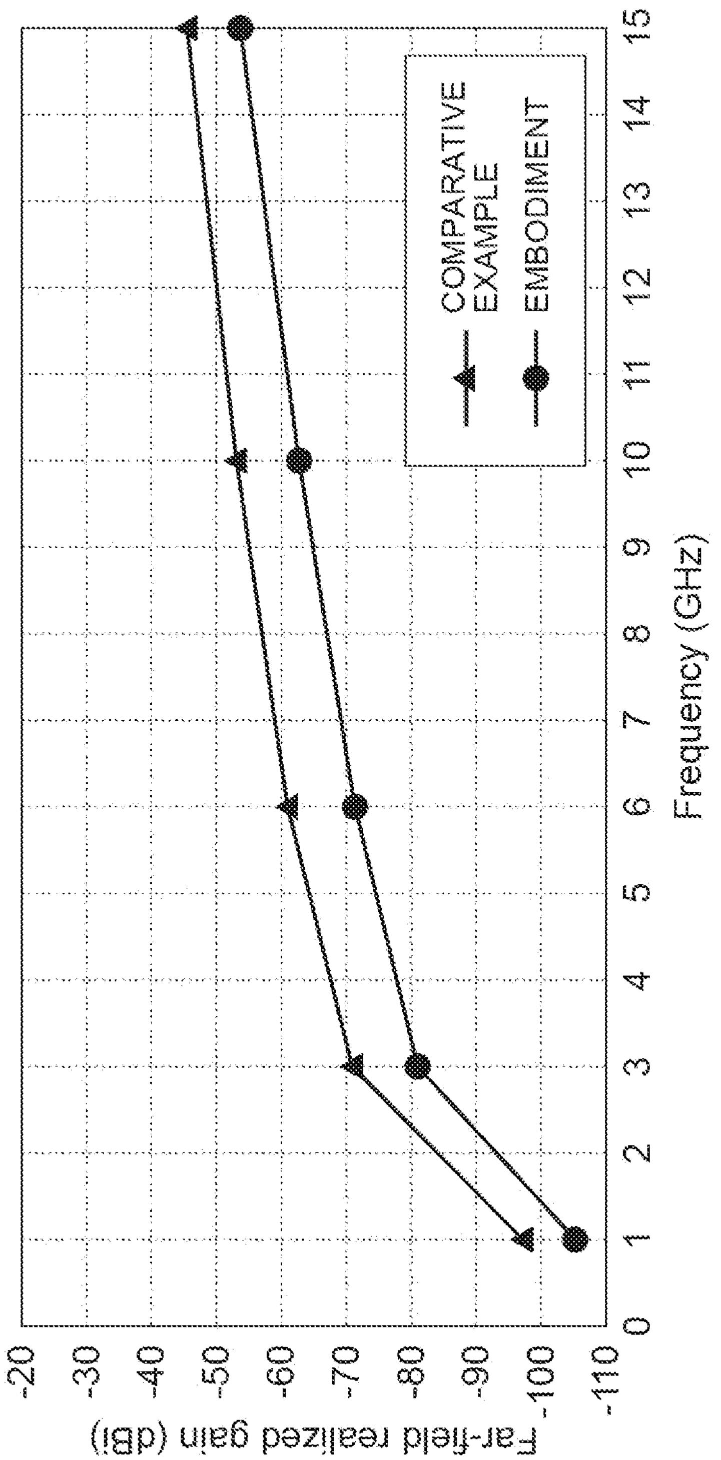
FIG. 9 is a graph showing EMI characteristics of the connector device.

FIG. 9 is a graph showing EMI characteristics in results of intensities of signals leaking to the outside of connector devices measured using the connector device 1 and the connector device 501 according to the comparative example. In FIG. 9, the vertical axis indicates far-field realized gain (dBi), and the horizontal axis indicates frequency (GHz). For example, the graph shows that EMI characteristics further deteriorate as they go higher in the vertical axis. In addition, FIG. 9 expresses values of the connector device 501 according to the comparative example with triangles and expresses values of the connector device 1 according to the present example with circles. As illustrated in FIG. 9, EMI characteristics of the connector device 1 are further improved than EMI characteristics of the connector device 501 according to the comparative example by approximately 10 dBi in all frequency bands.

[Operational Effects]

Next, operational effects of the foregoing receptacle connector 10 will be described.

The receptacle connector 10 of the present example is an electrical connector mounted on the substrate 200. The receptacle connector 10 includes the ground contact 11 having the cylindrical fitting portion 11*a* fitted into the ground contact 101 of the plug connector 100, and the grounding connection portion 11*b* connected to the substrate 200; the signal contact 12 disposed in a manner of being surrounded by the fitting portion 11*a* and electrically connected to the signal contact 102 of the plug connector 100; the housing 13*a* holding the ground contact 11 and the signal contact 12 in an insulated state; and the fixing portion 13*b* fixing the housing 13*a* to the ground contact 11. The signal contact 12 has the central conductor 12*a* coming into contact with the signal contact 102 of the plug connector 100, and the signal connection portion 12*b* extend along the substrate 200 in a manner of being drawn out from the central conductor 12*a* and connected to the signal terminal portion 201 of the substrate 200. The fixing portion 13*b* extends from the housing 13*a* in a direction intersecting the extending direction of the signal connection portion 12*b* and fixes the housing 13*a* to the ground contact 11 by being interlocked with the grounding connection portion 11*b* outside the fitting portion 11*a*.

In the electrical connector according to the aspect of the present disclosure, the fixing portion 13*b* extending in a direction intersecting the extending direction of the signal connection portion 12*b* connected to the signal terminal portion 201 of the substrate 200 from the housing 13*a* holding the ground contact 11 and the signal contact 12 is interlocked with the grounding connection portion 11*b* of the ground contact 11 outside the fitting portion 11*a*. Accordingly, for example, even when a load is applied to the housing 13*a* from the outside, the fixing portion 13*b* coupled to the housing 13*a* is interlocked with the grounding connection portion 11*b* outside the fitting portion 11*a*, and thus peeling of the housing 13*a* may be appropriately curbed. That is, in the electrical connector according to the aspect of the present disclosure, the housing 13*a* may be favorably held. Here, in order to employ a configuration in which the fixing portion 13*b* for holding the housing 13*a* described above is interlocked with the grounding connection portion 11*b*, there is a need to provide an opening for disposing the housing 13*a* (to be filled with a resin or the like forming the housing 13*a*) in the grounding connection portion 11*b* of the ground contact 11. In the electrical connector of the present disclosure, since the fixing portion 13*b* for holding the housing 13*a* is provided in a direction intersecting the extending direction of the signal connection portion 12*b*, it may employ a configuration in which the opening of the grounding connection portion 11*b* of the ground contact 11 for disposing the housing 13*a* is not formed in the extending direction of the signal connection portion 12*b*. Accordingly, in the grounding connection portion 11*b* of the ground contact 11, the opening in the extending direction of the signal connection portion 12*b* may be miniaturized or blocked. Consequently, a configuration in which a signal from the signal connection portion 12*b* is unlikely to leak to the outside (a configuration in which noise is unlikely to be generated) may be achieved, and thus EMI characteristics of the electrical connector may be improved.

In the foregoing receptacle connector 10, regarding the fixing portion 13*b*, a plurality of fixing portions are provided. According to such a configuration, the fixing portions 13*b* are interlocked in a plurality of locations of the grounding connection portions 11*b*, and thus the housing 13*a* may be more favorably held.

In the foregoing receptacle connector 10, regarding the fixing portion 13*b*, a pair of fixing portions are provided at positions symmetrical with respect to the centerline connecting the central conductor 12*a* and the signal connection portion 12*b* to each other when viewed in the Z direction that is the fitting direction to the plug connector 100. Accordingly, the housing 13*a* is held from both sides in a well-balanced manner, and thus the housing 13*a* may be favorably held.

In the foregoing receptacle connector 10, the fixing portion 13*b* is provided in a direction orthogonal to the extending direction of the signal connection portion 12*b*. Accordingly, the opening 11*c* for holding the housing 13*a* is formed at a position sufficiently separated in the extending direction of the signal connection portion 12*b*. Consequently, a configuration in which a signal from the signal connection portion 12*b* is unlikely to leak to the outside through the opening 11*c* for holding the housing 13*a* may be achieved, and thus EMI characteristics of the receptacle connector 10 may be further improved.

In the foregoing receptacle connector 10, in the grounding connection portion 11*b*, the opening 11*c* is formed in the extending direction of the fixing portion 13*b*. The fixing portion 13*b* is provided such that the opening 11*c* is filled. Accordingly, a configuration in which the fixing portion 13*b* is caused to appropriately pass through toward the outside of the fitting portion 11*a* and the opening 11*c* for holding the housing 13*a* is blocked may be achieved, and thus the housing 13*a* may be more favorably held.

In the foregoing receptacle connector 10, the grounding connection portion 11*b* has the narrow width portion 11*d* provided outside the fitting portion 11*a* such that the width of the opening 11*c* is narrowed. Accordingly, a configuration in which a signal from the signal connection portion 12*b* is less likely to leak to the outside through the opening 11*c* for holding the housing 13*a* may be achieved, and thus EMI characteristics of the receptacle connector 10 may be further improved. In addition, the fixing portion 13*b* is also interlocked in the narrow width portion 11*d* of the first contact, and thus the housing 13*a* may be more favorably held.

In the foregoing receptacle connector 10, the housing 13*a* is provided in only a region inside the fitting portion 11*a* in the extending direction of the signal connection portion 12*b*. Accordingly, since the end portion of the housing 13*a* excluding the fixing portion 13*b* stays inside the fitting portion 11*a*, that is, a resin does not flow in to the outside of the fitting portion 11*a*, a configuration in which the opening in the extending direction of the signal connection portion 12*b* may be further miniaturized or blocked and a signal from the signal connection portion 12*b* is unlikely to leak to the outside may be achieved, and thus EMI characteristics of the receptacle connector 10 may be further improved.

MODIFICATION EXAMPLE

It is to be understood that not all aspects, advantages and features described herein may necessarily be achieved by, or included in, any one particular example. Indeed, having described and illustrated various examples herein, it should be apparent that other examples may be modified in arrangement and detail. For example, an example in which a plurality of fixing portions 13*b* are provided has been described, but only one may be provided. In addition, the grounding connection portion 11*b* may not have the narrow width portion 11*d*.

Figure 10A:
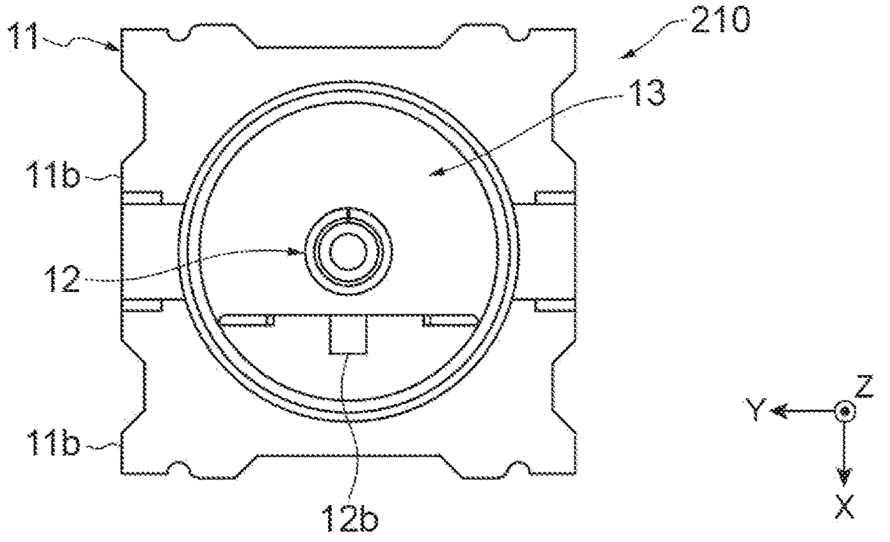
FIGS. 10A to 10C are views illustrating a receptacle connector according to a modification example.
Figure 10B:
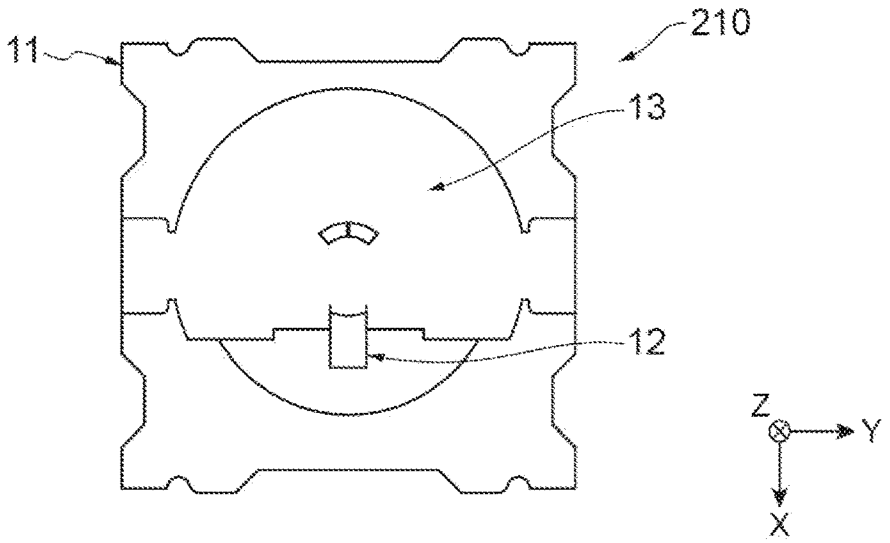
Figure 10C:
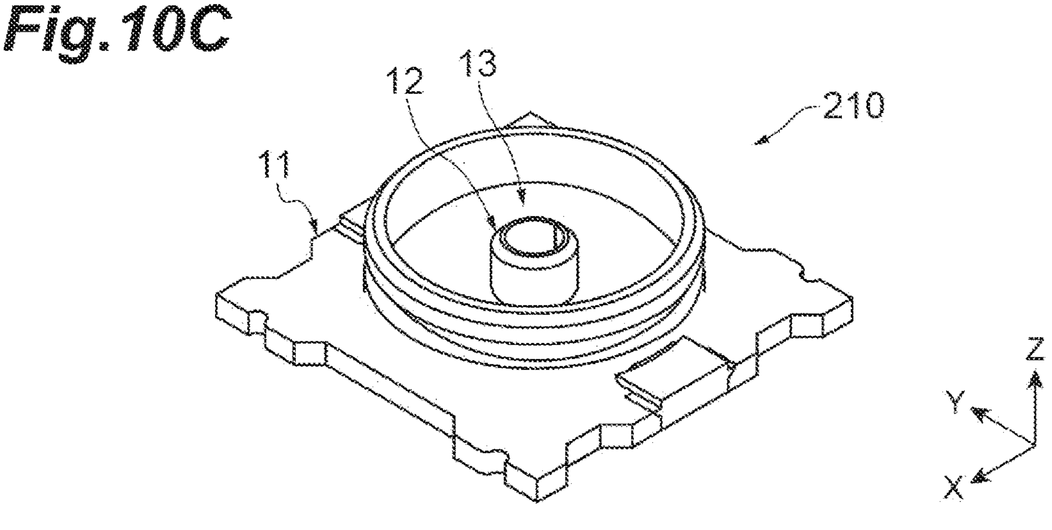

FIG. 10A to 10C are views illustrating a receptacle connector 210 according to a modification example. As illustrated in FIG. 10A to 10C, in the grounding connection portions 11*b* of the receptacle connector 210, as illustrated in FIG. 3A, the opening 11*e* in the extending direction of the signal connection portion 12*b* may not be formed. In this case, the grounding connection portions 11*b* are formed to be blocked in the X direction of the signal connection portion 12*b*. Accordingly, a signal from the signal connection portion 12*b* is less likely to leak to the outside, and thus EMI characteristics of the receptacle connector 210 may be further improved.

Figure 11A:
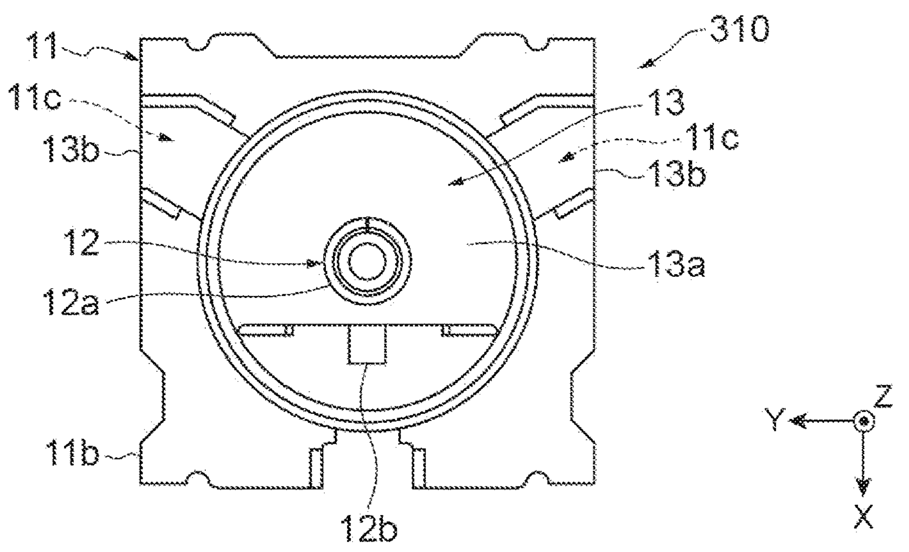
FIGS. 11A to 11C are views illustrating a receptacle connector according to another modification example.
Figure 11B:
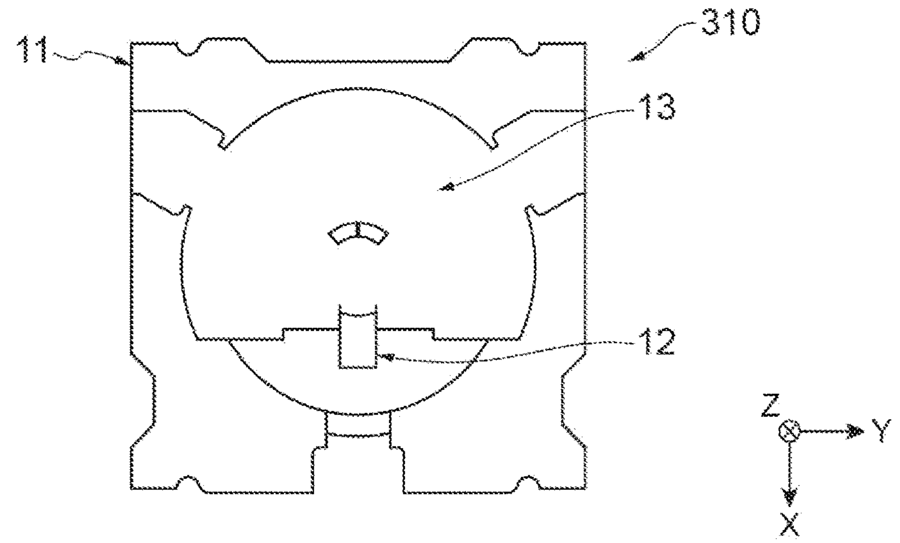
Figure 11C:
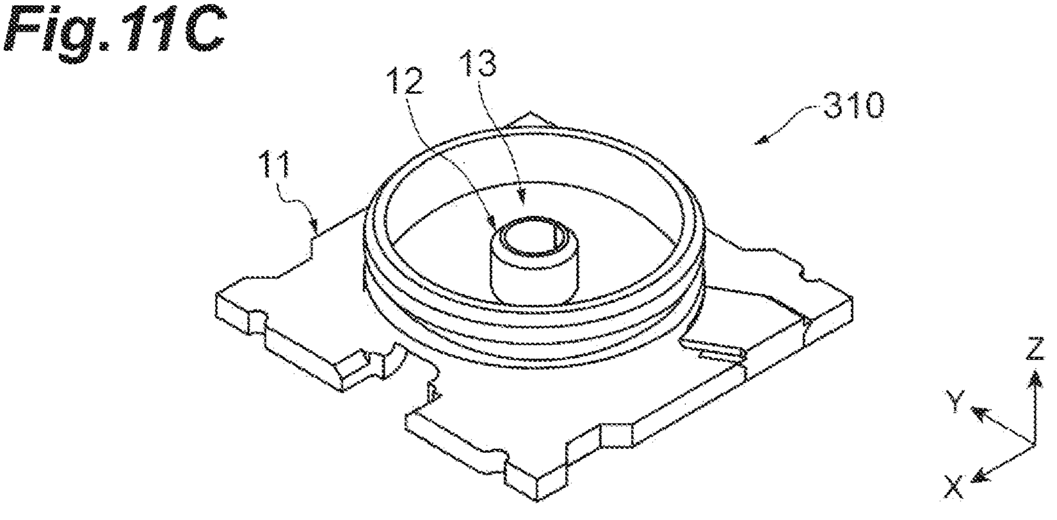

FIG. 11A to 11C are views illustrating a receptacle connector 310 according to another modification example. As illustrated in FIG. 11A to 11C, in a configuration in which the pair of fixing portions 13*b* and 13*b* are provided at positions symmetrical with respect to the centerline connecting the central conductor 12*a* and the signal connection portion 12*b* to each other when viewed in the Z direction, the pair of fixing portions 13*b* and 13*b* may be provided in a direction which is not orthogonal to the extending direction (X direction) of the signal connection portion 12*b*. In this case as well, the housing 13*a* is held from both sides in a well-balanced manner, and thus the housing 13*a* may be favorably held. The fixing portions 13*b* and 13*b* of the receptacle connector 310 may be formed in a direction opposite to the extending direction of the signal connection portion 12*b* based on the central conductor 12*a* rather than in a direction orthogonal to the extending direction of the signal connection portion 12*b*. Accordingly, the openings 11*c* and 11*c* for holding the housing 13*a* are formed at positions sufficiently separated in the extending direction of the signal connection portion 12*b*. Consequently, a configuration in which a signal from the signal connection portion 12*b* is unlikely to leak to the outside through the opening for holding the housing may be achieved, and thus EMI characteristics of the receptacle connector 310 may be further improved.

Figure 12A:
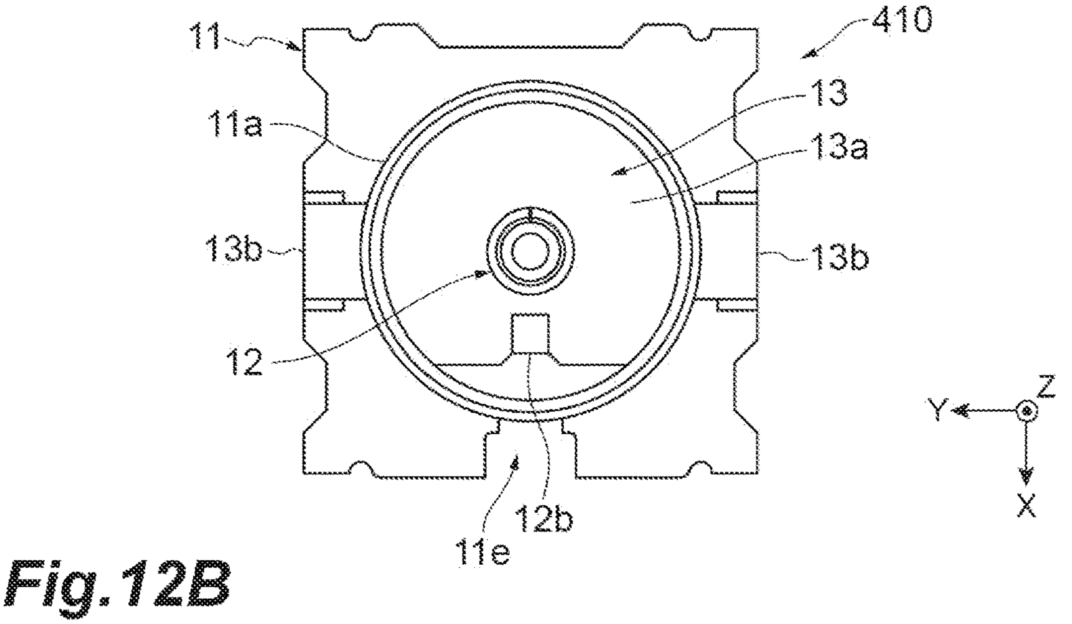
FIGS. 12A to 12C are views illustrating a receptacle connector according to another modification example.
Figure 12B:
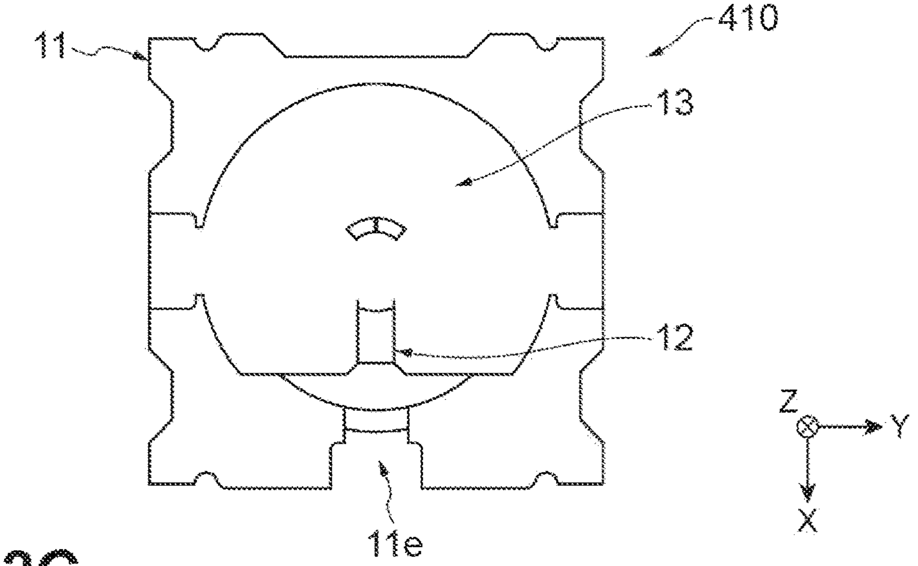
Figure 12C:
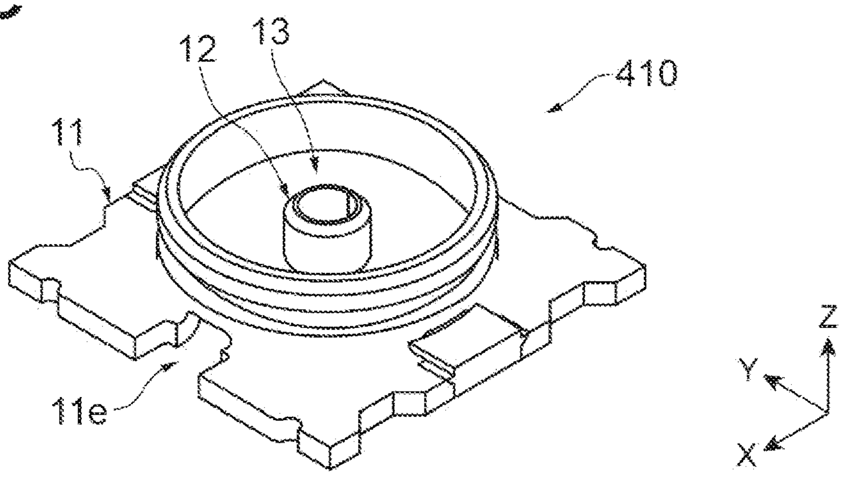

FIGS. 12A to 12C are views illustrating a receptacle connector 410 according to another modification example. As illustrated in FIGS. 12A to 12C, the housing 13*a* may be provided in a region closer to the central conductor 12*a* than the tip of the signal connection portion 12*b* in the extending direction of the signal connection portion 12*b* when viewed from a surface orthogonal to the extending direction of the signal connection portion 12*b*. In addition, regarding the signal connection portion 12*b*, the housing 13*a* may cover a surface of the signal connection portion 12*b* when viewed from a side fitted into the plug connector 100, and the signal connection portion 12*b* may be exposed to the outside when viewed from a side opposite to the side fitted into the plug connector 100.

What is claimed is:

1. An electrical connector mounted on a substrate, the electrical connector comprising:

a first contact comprising:

a cylindrical fitting portion fitted into a ground contact of a counterpart connector; and a grounding connection portion connected to the substrate;

a second contact surrounded by the fitting portion and electrically connected to a signal contact of the counterpart connector and comprising:

a central conductor coming into contact with the signal contact of the counterpart connector; and a signal connection portion extending in a first direction along the substrate from the central conductor and connected to a terminal portion of the substrate;

a housing holding the first contact and the second contact in an insulated state; and a fixing portion fixing the housing to the first contact, wherein the fixing portion extends from the housing in a second direction intersecting the first direction and fixes the housing to the first contact by being interlocked with the grounding connection portion outside the fitting portion.

2. The electrical connector according to claim 1, wherein the electrical connector comprises a plurality of fixing portions.

3. The electrical connector according to claim 2, wherein the electrical connector comprises a pair of fixing portions symmetrically positioned with respect to a hypothetical centerline connecting the central conductor and the signal connection portion, when viewed from a third direction which intersects the first direction and the second direction and is a fitting direction of the electrical connector to the counterpart connector.

4. The electrical connector according to claim 3, wherein the first direction and the second direction are orthogonal to each other.

5. The electrical connector according to claim 1, wherein an opening extending in the second direction is formed in the grounding connection portion, and wherein the fixing portion is formed by filling the opening.

6. The electrical connector according to claim 5, wherein the grounding connection portion comprises a narrow width portion provided outside the fitting portion such that a width of the opening in the first direction is narrowed.

7. The electrical connector according to claim 6, wherein the narrow width portion is positioned between the housing and the fixing portion.

8. The electrical connector according to claim 7, wherein a part of an outer circumferential surface of the housing comes into contact with the narrow width portion.

9. The electrical connector according to claim 6, wherein the narrow width portion is positioned in a vicinity of a center of the opening in the second direction.

10. The electrical connector according to claim 6, wherein the grounding connection portion comprises a plurality of narrow width portions.

11. The electrical connector according to claim 10, wherein each of the narrow width portions has a projection shape that protrudes in the first direction in which a pair of narrow width portions face each other.

12. The electrical connector according to claim 6, wherein the fixing portion is interlocked with the narrow width portion outside the fitting portion.

13. The electrical connector according to claim 1, wherein a whole portion of the housing exists inside the fitting portion, an area of the housing is smaller than an area surrounded by the fitting portion, and a tip of the signal connection portion is exposed to outside at a location corresponding to an area difference between the area of the housing and the area surrounded by the fitting portion.

14. The electrical connector according to claim 1, wherein a first opening extending in the first direction is formed in the grounding connection portion, and the terminal portion of the substrate passes through the first opening, and wherein a second opening extending in the second direction is formed in the grounding connection portion, and a first fixing portion passes through the second opening.

15. The electrical connector according to claim 14, wherein a third opening extending in the second direction and separated from the second opening in the second direction is formed in the grounding connection portion, and a second fixing portion passes through the third opening, and wherein the first opening is formed at a position at which a hypothetical line segment connecting the first opening and the central conductor of the second contact intersects a hypothetical line segment connecting the second opening and the third opening.

16. The electrical connector according to claim 14, wherein a third opening extending in the second direction and separated from the second opening in the second direction is formed in the grounding connection portion, and a second fixing portion passes through the third opening, and wherein the first opening is formed at a position at which a hypothetical line segment connecting the first opening and the central conductor of the second contact intersects orthogonally a hypothetical line segment connecting the second opening and the third opening.

17. The electrical connector according to claim 1,
wherein a first opening extending in the first direction is formed in the grounding connection portion, and the terminal portion of the substrate passes through the first opening,
wherein a second opening extending in a direction inclined to the second direction is formed in the grounding connection portion, and a first fixing portion passes through the second opening, and
wherein a third opening extending in a direction inclined to the second direction and an extending direction of the second opening is formed in the grounding connection portion, and a second fixing portion passes through the third opening.

18. The electrical connector according to claim 17,
wherein the first fixing portion and the second fixing portion are positioned symmetrically with respect to a hypothetical centerline connecting the central conductor and the signal connection portion, when viewed from a third direction which intersects the first direction and the second direction and is a fitting direction of the electrical connector to the counterpart connector.

19. The electrical connector according to claim 17,
wherein the first fixing portion and the second fixing portion extend away from the signal connection portion.

20. The electrical connector according to claim 1,
wherein no opening is formed in the first direction in the grounding connection portion.

* * * * *